Figure 1:
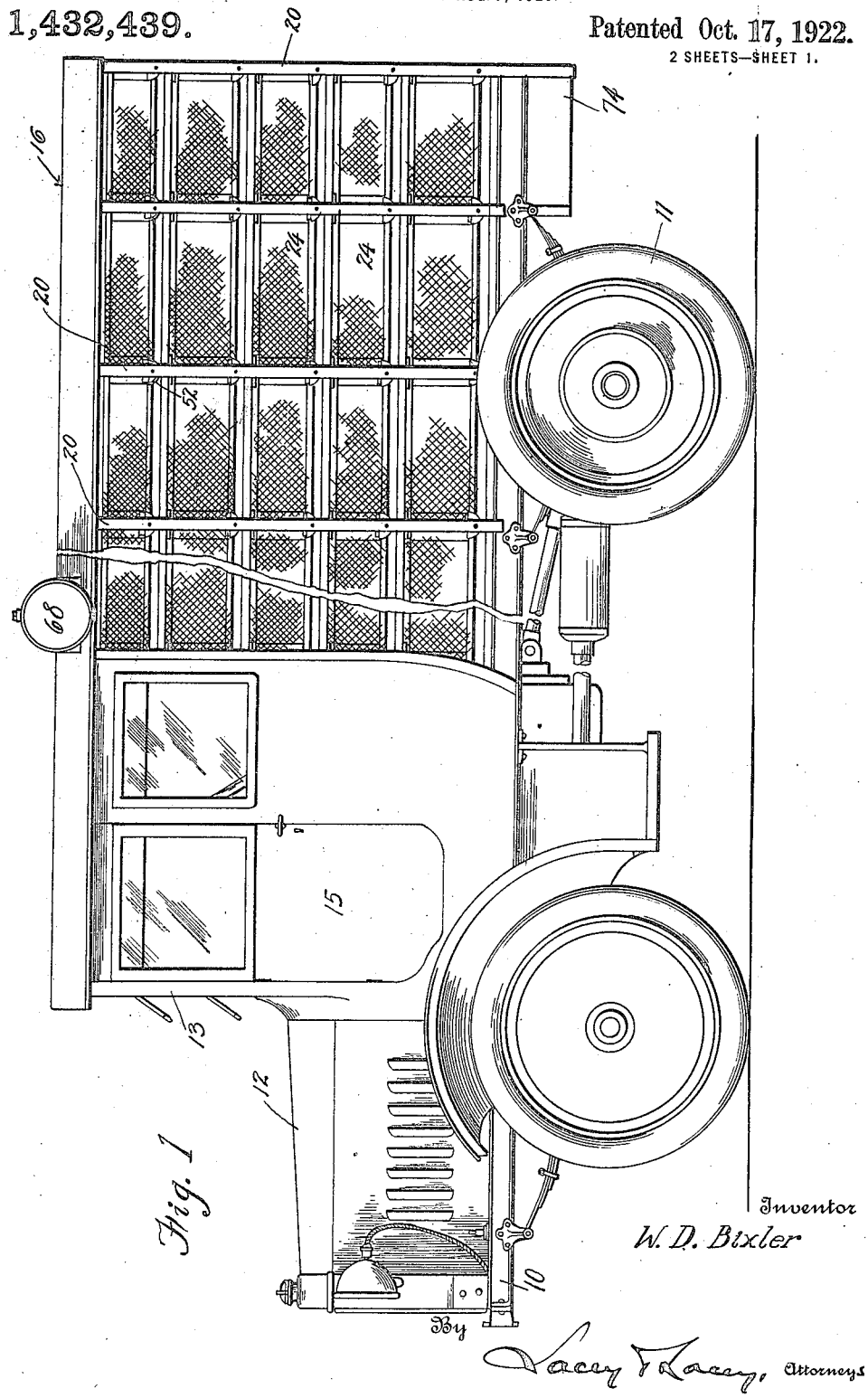

W. D. BIXLER.
POULTRY CARRYING BODY.
APPLICATION FILED AUG. 7, 1920.

1,432,439.

Patented Oct. 17, 1922.
2 SHEETS—SHEET 1.

Inventor
W. D. Bixler
By Lacey & Lacey, Attorneys

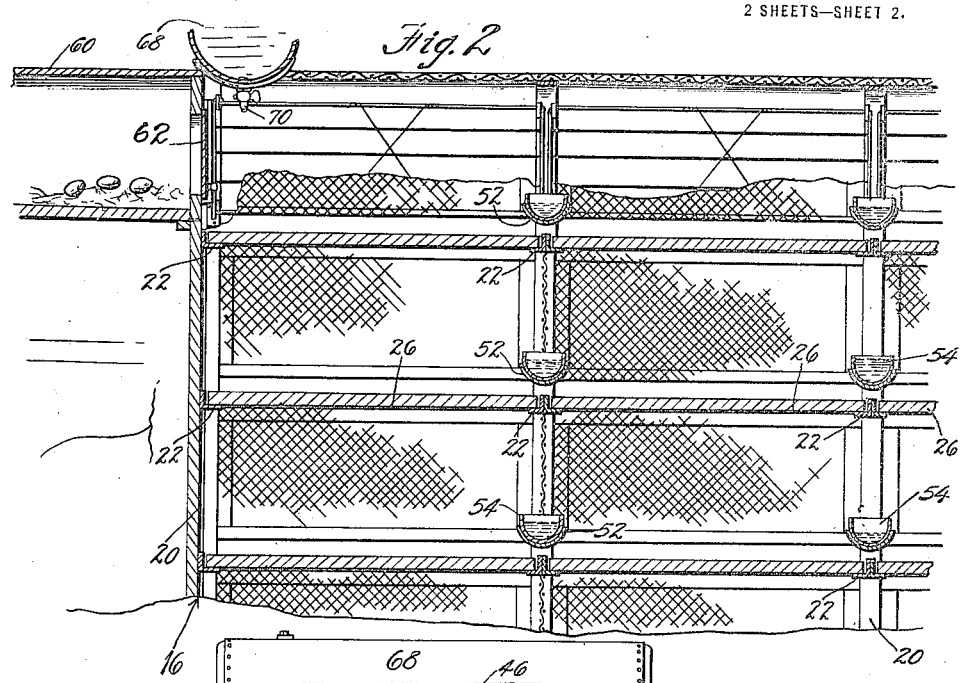
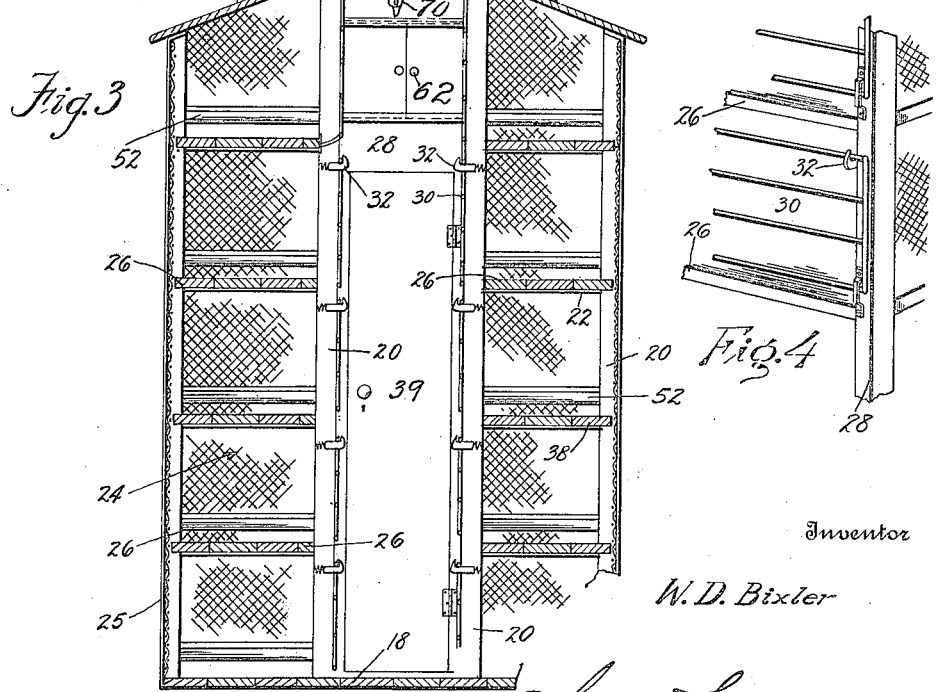

Patented Oct. 17, 1922.

1,432,439

UNITED STATES PATENT OFFICE.

WILLIAM D. BIXLER, OF OKLAHOMA, OKLAHOMA.

POULTRY-CARRYING BODY.

Application filed August 7, 1920. Serial No. 401,941.

*To all whom it may concern:*

Be it known that I, WILLIAM D. BIXLER, a citizen of the United States, residing at Oklahoma, in the county of Oklahoma and State of Oklahoma, have invented certain new and useful Improvements in Poultry-Carrying Bodies, of which the following is a specification.

This invention relates to improvements in vehicles and more particularly to the body construction thereof.

An important object of this invention is to provide a motor truck having a body provided with a plurality of crate sections especially adapted for receiving poultry so that poultry may be hauled great distances to the market without unnecessary discomfort.

A further object of the invention is to provide a truck body having a plurality of compartments or crate sections so arranged as to provide an aisle between the same so that an attendant may have ready access to all of the compartments for placing the poultry into the crates or compartments and for feeding the same.

A further object of the invention is to provide a truck body having a plurality of compartments or crate sections which are, by means of their arrangement and location, thoroughly ventilated so that the poultry within the same will at all times receive sufficient fresh air.

The invention forming the subject matter of this application aims also to provide a body of the class described having a water supply tank of considerable capacity so that the poultry within the several crates may be provided with fresh water from time to time.
A further aim of the invention is to provide a body of the class described having novel means for carrying a quantity of poultry feed and eggs.

A further object of the invention is to provide a body of the class described having a plurality of crate sections between which are arranged sectional water troughs parts of which may be removed for cleaning purposes.
Other objects and advantages of the invention will be apparent during the course of the following description.

In the accompanying drawings forming a part of this application and in which like numerals are employed to designate like parts throughout the same, Figure 1 is a fragmentary side elevation of a vehicle having the improved body applied, Figure 2 is a central vertical detail section through the body, Figure 3 is a vertical transverse section through the body, Figure 4 is a fragmentary perspective of the body.

In the drawings, wherein for the purpose of illustration is shown a preferred embodiment of the invention, the numeral 10 designates the frame of a motor vehicle which is mounted upon the running gear 11 which, as usual, consists of front and rear wheels and associated parts. The rear wheels of the vehicle are, of course, supplied with motive power by means of a motor located beneath a hood 12 and rearwardly of said hood a driver's cabin or compartment 13 is provided. The cabin or driver's compartment 13 may, if desired, be completely enclosed by glass windows 14 and by doors 15 partly of glass. It is obvious, however, that the driver's cabin is not necessarily completely enclosed.

The invention forming the subject matter of this application consists of a body generally designated by the numeral 16, which body is provided with means for receiving a large number of poultry to be conveyed to or from the market or other place. The improved body comprises a floor 18 which may be secured to the frame of the vehicle so that the body can not fall from the vehicle while traveling.

A plurality of spaced parallel vertically arranged standards 20 are secured to the sides of the floor 18 and are connected by a plurality of rows or tiers of supporting strips in the form of angle irons 22. The angle irons 22, which are preferably arranged in pairs, form a supporting means for a plurality of crate sections 24. As illustrated in Figures 2 and 4, the crate sections are provided with screened sides 25 which terminate above the floor sections 26 of the crates so as to provide a means whereby the floor of each crate may be readily and conveniently cleaned upon becoming soiled. As illustrated in Figure 3, the crate sections are arranged in a pair of tiers which provide an aisle 28 between the tiers of crate sections whereby an attendant may by walking down the aisle 28 have access to each and every one of the crates. Each of the crate sections is provided with a wire door 30 which is normally closed by a spring catch 32. The door is normally held in a closed position so that the poultry within the crate is prevented from escaping.

The top of each crate is closed so that refuse from the upper crate will be prevented from falling through the lower crate and so that rain will be prevented from entering any of the crates. The aisle 28 is covered by a screen 46 which permits thorough ventilation of the aisle and of the several crates. The screen or foraminous body 46 also provides a means for preventing the escape of any of the poultry should the same succeed in leaving any of the crate sections. The forward end of the aisle is provided with a door 39 which affords access to the driver's cabin and the rear end of the aisle is provided with a door preferably in the form of a screen.

As illustrated in Figure 2, a plurality of transversely extending troughs 52 are arranged between the adjacent ends of the crate sections and are provided with detachable sections 54 which may be readily removed for cleaning purposes or for refilling.

A receptacle 60 is arranged at the forward portion of the crate sections and forms an egg receiving compartment so that eggs as well as poultry may be carried. Access may be had to the egg compartment by means of a double sliding door 62 which may be opened from the aisle.

As clearly illustrated in Figure 2, the body is provided with a cylindrical water tank 68 which is provided with a drain cock 70 opening out into the aisle 28 so that the attendant may at any time draw a quantity of water from the tank for the purpose of watering the poultry.

As illustrated in Figure 1, the rear portion of the body is provided below the vehicle frame 10 with a feed box 74 which may be provided with a suitable type of door so that the feed may be removed as desired for the purpose of supplying the poultry.

With reference to the foregoing description taken in connection with the accompanying drawings, it will be observed that a vehicle body constructed in accordance with the invention may be readily and conveniently mounted on a motor truck so that the poultry may be conveyed either to or from the market or other place. The various brands of poultry may be conveniently separated since the several crate sections are separated by partitions.

It is to be understood that the form of the invention herewith shown and described is to be taken as a preferred example of the same and that such minor changes in the arrangement and construction of parts may be made as will remain within the spirit of the invention and the scope of what is claimed.

Having thus described the invention, what is claimed as new is:

A poultry-carrying body comprising a rear compartment, crates supported in said compartment, a cabin at the front end of the body, and an egg compartment in the upper portion of the cabin and accessible from the rear compartment.

In testimony whereof I affix my signature.

WILLIAM D. BIXLER. [L. S.]